3,102,081
ENZYME PRECIPITATION PROCESS

James W. Faucett, Wyckoff, Walter W. Windish, Paterson, and Richard A. De Senna, Ridgewood, N.J., assignors to Miles Laboratories, Inc., Elkhart, Ind., a corporation of Indiana
No Drawing. Filed Apr. 18, 1960, Ser. No. 22,664
6 Claims. (Cl. 195—68)

This invention relates to a process for the preparation of enzyme systems in dry, solid, stable form. More particularly, the invention relates to a process for the recovery of enzyme systems from water solutions thereof. In one of its more particular aspects this invention relates to a process for the coprecipitation of an enzyme system from a water solution thereof by agitation with a slurry of a coprecipitant in a non-solvent therefor. This application is a continuation-in-part of Serial No. 704,276, filed December 23, 1957, now abandoned.

Methods for the precipitation of enzyme systems from water solutions thereof have been taught by the prior art. One such procedure involves use of an alcohol alone as a precipitant; another teaches the use of a soluble salt such as ammonium sulfate or the like; another method teaches use of an inert diluent such as a cellulose derivative. The prior art methods, however, all have a pronounced disadvantage in that the precipitate formed is often in the form of a gummy, sticky mass which is difficult to filter and which, when dried, forms agglomerate lumps which require comminution with a corresponding loss of enzyme potency.

The instant invention relates to a process for the precipitation of enzyme systems from water solutions thereof which has none of the disadvantages of the prior art. The product resulting from the instant process is a dry stable solid mixture of the enzyme system and a coprecipitant. Where the coprecipitant is, for example, an edible salt of a food acid such as sodium gluconate, the product has the added advantage of being completely edible and, therefore, useful in a wide variety of food applications. The coprecipitated mixture of the enzyme and coprecipitant is easily filterable to a friable filter-cake which is readily dried to an easily comminuted powder without the characteristic loss of enzyme potency referred to above.

Briefly, the invention comprises mixing a water extract containing dissolved therein an enzyme system with a slurry of a coprecipitant in a suitable non-solvent for said coprecipitant and said enzyme system. The slurry is held at depressed temperatures and intimate contact is maintained by continuous agitation until the precipitate is completely formed.

The procedure of this invention is adaptable to any enzyme system such as plant or animal enzymes, fungal or bacterial enzymes, whether intracellular or intercellular in character.

For example, enzyme solutions or suspensions which may be processed in accordance with the instant invention to yield dry solid stable precipitates include enzymes of oxidation such as glucose oxidase, proteolytic enzymes such as proteases and peptidases including pepsin, trypsin, papain, ficin, bromelin and the like, carbohydrases such as pectolytic enzymes, amylases and invertases, catalase, ureases, lipases, phosphatases, peroxidases, sulfidases, phenolases, and the like and mixtures of these enzymes.

It will, of course, be obvious that since solubility considerations are paramount in the practice of this invention it is essential that in order to obtain the highest yield of enzyme upon coprecipitation thereof the selection of a suitable non-solvent for the particular enzyme and the particular coprecipitant be carefully made.

The coprecipitant may be any substance which is relatively insoluble in the non-solvent utilized in the process and which is finely divided so as to provide the necessary surface for coprecipitation of the enzyme system. Such substances include a wide variety of materials such as salts, carbohydrates, and proteins, as well as other materials having the desired properties. One particularly useful and interesting class of such materials is the salts of food acids which, as described above, find special application in the food industry. Exemplary of such compounds are the salts of monobasic or polybasic aliphatic carboxylic acids containing from 2 to 6 carbon atoms. For example, the sodium, potassium or ammonium salts of gluconic, acetic, malic, citric, lactic, tartaric, succinic, saccharic, galacturonic, ascorbic, isoascorbic and related acids may be used in the inventive concept of this invention. The preferred salt, and indeed the preferred coprecipitant, is sodium gluconate.

The amount of coprecipitant utilized in the process of this invention will depend upon the enzyme potency desired in the final product, as well as upon the solubility of the coprecipitant in the non-solvent chosen for use. Since the coprecipitant is coprecipitated with the enzyme system, and in some cases may even form a complex therewith, the greater the amount of the coprecipitant used for a given amount of enzyme, the less potent will be the resulting product. It is accordingly preferred to use about equal parts by weight of enzyme and the coprecipitant so as to result in a product comprising a 1:1 mixture, by weight, of the salt of the coprecipitant and the enzyme. However, this ratio may vary from as high as about 10:1 or more to less than 1:1. The preferred ratio will lie within the range of from about 5:1 to 1:1.5.

The non-solvent to be used in the process may be any compound in which both the enzyme and the coprecipitant are insoluble and which is non-reactive with the enzyme being coprecipitated. For this purpose, low molecular weight aliphatic oxygen containing compounds have been found particularly useful. Especially preferred are hydroxy, alkoxy and keto compounds such as methanol and ethanol, propanols, butanols, glycerol, glycols, for example propylene glycol, acetone, dioxane and similar compounds, all of which are characterized by being miscible with water and non-reactive with most enzyme systems. If desired, mixtures of these compounds may be used. For example, an equal volume of methanol and ethanol might be employed if desired. The non-solvent is preferably chilled prior to mixture with the water extract of the enzyme system, for example, to a temperature of 40° to 45° F. and is preferably maintained at a low temperature throughout the time of contact. In the case of some of the common organic solvents which may be used for this process it is preferred that the materials have a purity of from about 90% to 100%. In the case of ethanol, for example, the use of 95% ethanol as the non-solvent is acceptable.

The amount of the non-solvent used will depend somewhat upon the enzyme system being coprecipitated and upon the particular non-solvent chosen. It is essential that during the coprecipitation step the precipitate should become sufficiently dehydrated to obtain a well coagulated, easily filterable product. Generally speaking, it has been found that a volume of from 1.5 to 4.5 volumes of non-solvent per volume of the water extract of the enzyme system may be used. Larger volumes of non-solvents may be used if desired. However, with volumes of non-solvent in excess of 4.5 volumes per volume of extract, no further increase in yield is ordinarily obtained and the potency of the product on a weight basis is reduced due to the precipitation of non-enzymatic inert material. In a preferred embodiment of this invention from about 2.5 to 4.0 volumes of ethanol per volume of the enzyme extract is used.

In carrying out the procedure of this invention it is possible to either add the water extract of the enzyme system to the slurry of the coprecipitant in the non-solvent, or to add the coprecipitant slurry to the enzyme extract. Generally, better results are obtained by adding the enzyme extract to the coprecipitant slurry. This may be because it is thus possible to agitate the slurry of the coprecipitant in the non-solvent during the addition of the enzyme system. Preferably the water extract of the enzyme system is introduced into the coprecipitant slurry at a point beneath the surface of the slurry. In this way it can be insured that there is intimate contact between the slurry and the enzyme system. It is important, moreover, that the slurry be maintained at a reduced temperature throughout the precipitation.

Recovery of the coprecipitated enzyme is conventional and forms no part of the inventive concept. Ordinarily, the supernatant liquid is decanted and the residue filtered or centrifuged to further separate the remaining liquid therefrom. Washing of the separated solids with additional non-solvent, followed by further filtration and drying insures a stable product with little loss in potency. If desired, the solids may then be more finely divided, such as by grinding or the like.

The procedure of this invention is characterized by producing a product which will be considerably easier to process than any product obtained by previous prior art methods. This product dehydrates easily and is readily separable. In addition, it is frequently possible to realize improved yields of enzymes by practicing the procedures of this invention.

This invention will be more readily understood by reference to the following examples which are intended for purposes of illustration, and are not to be construed in any way limiting the scope of the instant invention.

EXAMPLE I

A water extract of an enzyme system was obtained as follows:

A fermentation medium comprising a carbohydrate source, a nitrogen source and requisite trace minerals was made up to a volume of 2500 gallons in a fermentation vessel. The medium contained 7.3% dextrose. It was pasteurized, cooled and inoculated with *Aspergillus niger*. The fermentation was allowed to proceed for approximately 13 hours with agitation. A temperature of 88° F. was maintained as was aeration at a rate of 70 c.f.m.

After the fermentation was completed the mycelium was filtered from the fermentation beer, washed, ground and extracted with 200 gallons of water.

The water extract was assayed for enzyme activity and gave the following:

Glucose oxidase _____units/ml__ 55
Catalase _____do____ 100
Solution pH_____ 6.4–6.6

A glucose oxidase unit is defined as the amount of glucose oxidase which will cause an oxygen uptake of ten micromilliliters per unit when the enzyme acts on glucose as substrate under standard conditions. A catalase unit is defined as the amount of catalase which will decompose 300 mg. of hydrogen peroxide under standard conditions.

A slurry of sodium gluconate in ethanol was prepared by rapidly stirring a chilled alcohol of 95% purity and adding slowly the desired amount of the salt. While agitation was continued the water extract containing the enzyme was added to the alcohol-salt slurry beneath the surface. Agitation was continued for 15 minutes. The mixture was then allowed to remain quiescent and the precipitate allowed to settle. The alcohol-water was then decanted and the residue filtered, washed with cold ethanol, and dried. There was obtained a stable solid material which assayed as follows:

Glucose oxidase _____ 3200/gm.
Catalase _____ 2000/gm.
Percent glucose oxidase recovery_____ 94.0
Percent catalase recovery_____ 50.5

The following example is included to illustrate the effect of the use of varying amounts of a non-solvent in coprecipitating an enzyme system from a water extract.

EXAMPLE II

Using the procedure described in Example I above, and varying only the amount of alcohol used to precipitate the enzyme system from the water extract, the following data were obtained:

Table I

EFFECT OF VOLUME OF NON-SOLVENT ON ENZYME COPRECIPITATION

| Volume of alcohol:[1] | Percent recovery glucose oxidase |
|---|---|
| 0.5 | 0.0 |
| 1.0 | 7.3 |
| 1.5 | 58.5 |
| 2.0 | 94.0 |
| 2.5 | 94.0 |
| 3.0 | 95.0 |
| 3.5 | 94.0 |
| 4.0 | 94.0 |

[1] 3.0 gm. of sodium gluconate suspended in alcohol 1.0 volume of water extract of enzyme of pH 6.8.

An examination of the data of Table I above will point out that while the amount of alcohol per volume of extract may be varied from about 1.5 to about 4.5 volumes, optimum results are obtained with 2.0 to 4.0 volumes of alcohol per volume of water extract. Higher volumes of alcohol may be used. However, no further increase in yield of enzymes is obtained and the potency of the product on a weight basis is reduced due to precipitation of non-enzymatic inert material.

The following example is included to illustrate the effect of different non-solvents on enzyme coprecipitation.

EXAMPLE III

In accordance with the procedure described in Example I above, various non-solvents were used to coprecipitate the slurried coprecipitant and enzyme. Data are set out in Table II below.

Table II

EFFECT OF DIFFERENT NON-SOLVENTS ON ENZYME COPRECIPITATION

| Non-solvent used [1] | Vol. | Percent enzyme recovery |
|---|---|---|
| Ethanol | 1.0 | 7.3 |
|  | 1.5 | 58.5 |
|  | 2.0 | 94.0 |
|  | 2.5 | 94.0 |
|  | 3.0 | 95.0 |
| Isopropanol | 1.0 | 73.1 |
|  | 1.5 | 87.4 |
|  | 2.0 | 85.7 |
|  | 2.5 | 75.6 |
|  | 3.0 | 57.1 |
| Methanol | 1.0 | 10.9 |
|  | 1.5 | 27.3 |
|  | 2.0 | 49.5 |
|  | 2.5 | 32.7 |
|  | 3.0 | 6.4 |
| Acetone | 1.0 | 15.0 |
|  | 1.5 | 37.5 |
|  | 2.0 | 68.0 |
|  | 2.5 | 45.0 |
|  | 3.0 | 8.8 |

[1] 3.0 gm. of sodium gluconate suspended in non-solvent.

It will be apparent from an examination of the data in Table II above that ethanol is to be preferred as the non-solvent because of the high yields obtained. However, isopropanol, methanol or acetone may be used so long as the water extract to non-solvent volume ratio is carefully controlled.

The following example illustrates the effect of various coprecipitants of the food acid series upon enzyme coprecipitation.

EXAMPLE IV

Using the procedure described in Example I above, various coprecipitants were substituted for sodium gluconate with the following results:

Table III
EFFECT OF COPRECIPITANT ON ENZYME COPRECIPITATION [1]

| Coprecipitant: | Percent enzyme recovery |
|---|---|
| Sodium gluconate | 95.0 |
| Potassium gluconate | 90.0 |
| Sodium citrate | 86.0 |
| Sodium succinate | 90.0 |
| Sodium acetate | 50.0 |

[1] 3.0 grams of coprecipitant per volume of ethanol per ⅓ volume of water extract.

These data show that various coprecipitants may be used with success in the practice of the instant invention.

The following example illustrates the use of coprecipitants not of the food acid series in the coprecipitation process of the instant invention.

EXAMPLE V

To 700 ml. of 95% ethanol there was added with agitation, 200 ml. of a glucose oxidase extract obtained in accordance with the procedure of Example I. Agitation was continued for 5 minutes. After one hour of settling, the supernatant liquor was drawn off and an equal volume of 95% of ethanol was added at 50° F. and agitated for one minute. After 30 minutes settling, the supernatant liquor was decanted and an equal volume of anhydrous ethanol was added and agitated for one minute. The contents were then poured into a previously weighed centrifuge cup and centrifuged for 30 minutes at 2,000 r.p.m. The supernatant liquor was poured off and the cups were dried under vacuum at 90° F. for 17 hours. The powder obtained was ground and assayed.

In order to test the effect of different coprecipitants upon the coprecipitation, two grams of the coprecipitant were added to 700 ml. of 95% ethanol and the above procedure thereafter followed. The results are shown in Table IV below.

Table IV

| Coprecipitant: | Percent recovery |
|---|---|
| None | 73.2 |
| Sodium chloride | 85.2 |
| Corn starch | 89.8 |

These data show that the percent recovery of enzyme is greatly increased by use of a coprecipitant in accordance with the teachings of this invention.

The following example is included to show the applicability of the process of this invention to a wide variety of enzyme systems.

EXAMPLE VI

One volume of water extract of enzyme was added to three volumes of 95% ethanol and the mixture treated according to the procedure of Example V. The enzymes and coprecipitants used and the recoveries are shown in Table V below:

Table V

| Enzyme | Coprecipitant | Percent recovery |
|---|---|---|
| Fungal Amylase |  | 66.92 |
| Do | Sodium Gluconate | 77.28 |
| Pectinase |  | 83.5 |
| Do | Sodium Gluconate | 92.0 |
| Fungal Proteinase [1] |  | 80.1 |
| Do [1] | Sodium Gluconate | 84.3 |
| Bacterial Amylase |  | 63.5 |
| Do | Sodium Gluconate | 88.4 |
| Bacterial Proteinase |  | 53.4 |
| Do | Sodium Gluconate | 78.4 |

[1] Ethanol was added to the water extract.

From these data it can be seen that the process of this invention is applicable to a wide variety of enzymes, both fungal and bacterial. Fungal amylase, for example, is a fungal enzyme as are pectinase and fungal proteinase. Bacterial amylase and bacterial proteinase, on the other hand, are bacterial enzymes.

The following example illustrates the use of solvents of the alkoxy and keto series in the process of this invention and the necessity for use of a water miscible non-solvent.

EXAMPLE VII

The process of Example VI was followed using the enzymes, nonsolvents and coprecipitants shown in Table VI below. The results are as shown in Table VI.

Table VI

| Enzyme | Non-solvent | Coprecipitant | Percent recovery |
|---|---|---|---|
| Glucose oxidase | Dioxane |  | 65.3 |
| Do | do | Sodium gluconate | 72.1 |
| Do | Methyl ethyl ketone |  | (¹) |
| Do | do | Sodium gluconate | (¹) |
| Papain | Acetone |  | 87.2 |
| Do | do | Sodium gluconate | 93.6 |

[1] Two different liquid phases were present with a solid coagulum at the interface. No recovery possible.

These data show that other non-solvents having the requisite solubility characteristics may be used in the process of this invention. It is interesting to note that the results using methyl ethyl ketone were negative. This points up the requirement that the non-solvent must be water miscible, for the unsatisfactory results can be ascribed to the fact that methyl ethyl ketone is only about 30% miscible with water.

As was stated above, the examples set out in detail herein are illustrative only, and those skilled in the art will recognize other possible variations.

To reiterate, the instant invention relates to improved processes for the coprecipitation of enzyme systems from water solutions thereof which comprises the steps of admixing said enzyme water solution with a slurry of a coprecipitant for said enzyme in a non-solvent for both the enzyme and the coprecipitant.

What is claimed is:

1. A process for the recovery of an enzyme system from a water extract of same which comprises the steps of contacting said water extract with a slurry of a finely divided salt of an acid selected from the group consisting of monobasic and polybasic monomeric aliphatic carboxylic acids of from 2 to 6 carbon atoms in a water miscible low molecular weight aliphatic oxygen containing compound in which both said enzyme system and said salt are substantially insoluble and recovering a water soluble coprecipitated enzyme system therefrom.

2. The process of claim 1 wherein the oxygen containing compound is ethanol.

3. The process of claim 1 wherein the enzyme system contains glucose-oxidase.

4. The process of claim 1 wherein the enzyme system contains catalase.

5. The process of claim 1 wherein the salt is a salt of a food acid.

6. The process of claim 1 wherein the salt is sodium gluconate.

References Cited in the file of this patent

UNITED STATES PATENTS

| 2,635,069 | Baker | Apr. 14, 1953 |
| 2,922,749 | Snyder et al. | Jan. 26, 1960 |